(12) United States Patent
Pfaff

(10) Patent No.: US 6,199,101 B1
(45) Date of Patent: Mar. 6, 2001

(54) PROCESS FOR ACCESS CONTROL TO COMPUTER-CONTROLLED PROGRAMS USABLE BY SEVERAL USER UNITS AT THE SAME TIME

(75) Inventor: Oliver Pfaff, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/077,510

(22) PCT Filed: Nov. 28, 1996

(86) PCT No.: PCT/DE96/02284

§ 371 Date: Jun. 3, 1998

§ 102(e) Date: Jun. 3, 1998

(87) PCT Pub. No.: WO97/23825

PCT Pub. Date: Jul. 3, 1997

(30) Foreign Application Priority Data

Dec. 22, 1995 (DE) .............................. 195 48 397

(51) Int. Cl.[7] .................................................. G06F 15/16
(52) U.S. Cl. ............................................. 709/204; 705/51
(58) Field of Search ................................... 713/169, 171, 713/176, 168, 170; 380/285, 283, 30

(56) References Cited

U.S. PATENT DOCUMENTS

| | | | |
|---|---|---|---|
| 5,008,853 | * | 4/1991 | Bly et al. ............................ 364/900 |
| 5,107,443 | * | 4/1992 | Smith et al. ........................ 395/158 |
| 5,220,657 | * | 6/1993 | Bly et al. ............................ 395/425 |
| 5,337,407 | * | 8/1994 | Bates et al. ......................... 395/153 |
| 5,339,388 | * | 8/1994 | Bates et al. ......................... 395/153 |
| 5,339,389 | * | 8/1994 | Bates et al. ......................... 395/153 |
| 5,392,400 | * | 2/1995 | Berkowitz et al. ................. 395/200 |
| 5,446,842 | * | 8/1995 | Schaeffer et al. ............ 395/200.01 |
| 5,515,491 | * | 5/1996 | Bates et al. ......................... 395/155 |
| 5,787,175 | * | 7/1998 | Carter ................................... 380/25 |
| 5,844,553 | * | 12/1998 | Hao et al. ........................... 345/329 |

FOREIGN PATENT DOCUMENTS

| | | |
|---|---|---|
| 0 477 039 | 3/1992 | (EP) . |
| 0477039 | * 3/1992 | (EP) . |
| 0523881 | * 1/1993 | (EP) . |
| 0 523 881 | 1/1993 | (EP) . |
| 2 238 636 | 5/1991 | (GB) . |
| 2238636 | * 5/1991 | (GB) . |

OTHER PUBLICATIONS

An Advanded Application Sharing System for Synchronous Collaboration in Heterogeneous Environments (Minenko et al., Dec. 1994, SIGIOS Bulletin—vol. 15, No. 2, pp. 40–44).*

HP SharedX: A Tool for Real–Time Collaboration (Garfinkel et al., Apr. 1994, 1266 Hewlett–Packard Journal 45 No. 2, pp. 23–35).*

Operating System Features for Shared Workspace Cooperation (Guan, Mar. 1991, IEEE, pp. 321–325).*

(List continued on next page.)

*Primary Examiner*—Tod R. Swann
*Assistant Examiner*—Michael E. Greco
(74) *Attorney, Agent, or Firm*—Schiff Hardin & Waite

(57) ABSTRACT

A method for access control to computer-controlled programs, which can be used at the same time by a plurality of users. A user sends a request regarding a program to a unit for organizing a data flow. It is checked in this unit whether the user which sent the request, has originally started the program. When the user sending the request has started the program, the request is forwarded to the program. If not, an access control with respect to the request is carried out on the basis of an access control data bank. When it derives from the access control that the request is an allowed request, the request is forwarded to the program. When it derives from the access control that the request represents an unallowed request, the request is not forwarded to the program.

6 Claims, 7 Drawing Sheets

OTHER PUBLICATIONS

The X Window System (Scheifler et al., Apr. 1986, ACM Transactions on Graphics—vol. 5 No. 2, pp. 79–109).*

Issues, Problems and Solutions in Sharing X Clients on Multiple Displays (Abdel–Wahab et al., 1994, Internetworking: Research and Experience—vol. 5, pp. 1–15).*

HP SharedX: A Tool for Real–Time Collaboration (Garfinkle et al., Apr. 1994, Hewlett–Packard Journal, pp. 23–35).*

Group Coordination in Participant Systems (Chang et al., 1991, IEEE, pp. 589–599).*

A Telepointing Tool for Distributed Meeting Systems (Nakajima et al., 1990, IEEE, pp. 0076–0080).*

The Implications of Window Sharing for a Virtual Terminal Protocol (Patterson, 1990, IEEE, 0066–0070).*

Product Review: Intel ProShare (Herter, Jan. 1995, Accounting Technology, pp. 49–54).*

Integration of Existing Applications into a Conference System (Riexinger et al., IBM European Networking Center, pp. 346–355).*

SIGOIS Bulletin, Dec. 1994/vol. 15, No. 2 XP 000672421—pp. 40–44.

HP Shared X: A Tool for Reala–Time Collaboration—1266 Hewlett–Packard Journal 45(1994) Apr., No. 2, Palo Alto, CA, US. pp. 23–35.

Operating System Features For Shared Workspace Cooperation—Guan—1991 IEEE.

The X Window System—Scheifler—ACM Transactions on Graphics, vol. 5, No. 2, Apr. 1996.

Internetworking: Research And Experience, vol. 5, 1–15 (1994)—Issues, Problems and Solutions in Sharing X Clients on Multiple Displays.

HP SharedX: A Tool For Real–Time Collaboration—Apr. 1994 Hewlett–Packard Journal pp. 23–35.

Group Coordination in Participant Systems—Chang et al—1991 IEEE—pp. 589–599.

A Telepointing Tool For Distributed Meeting Systems—Nakajima et al–1990 IEEE pp. 0076–0080.

The Implications Of Window Sharing For A Virtual Terminal Protocol—Patterson—1990 IEEE.

Intel ProShare—Gerald Herter—Jan. 1995 Accounting Technology.

Integration of Existing Applications into a Conference System—Riexinger et al—IBM European Networking Center.

* cited by examiner

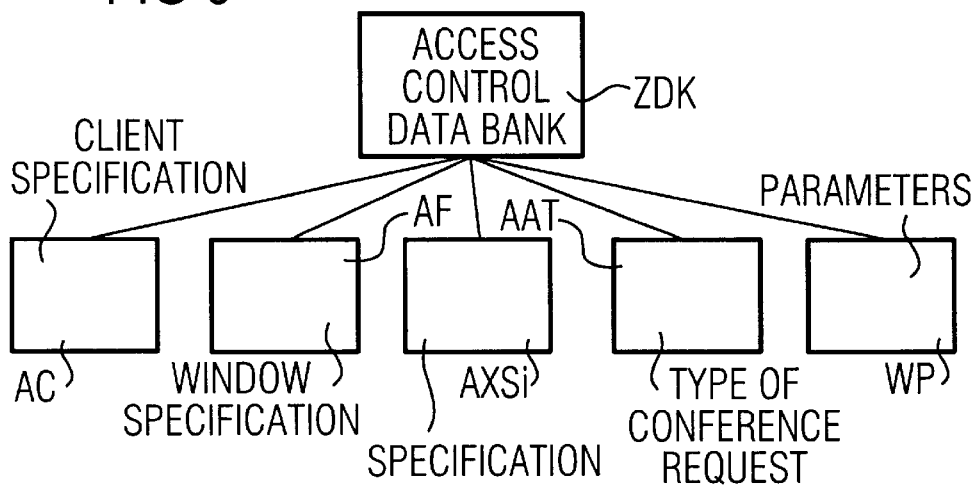
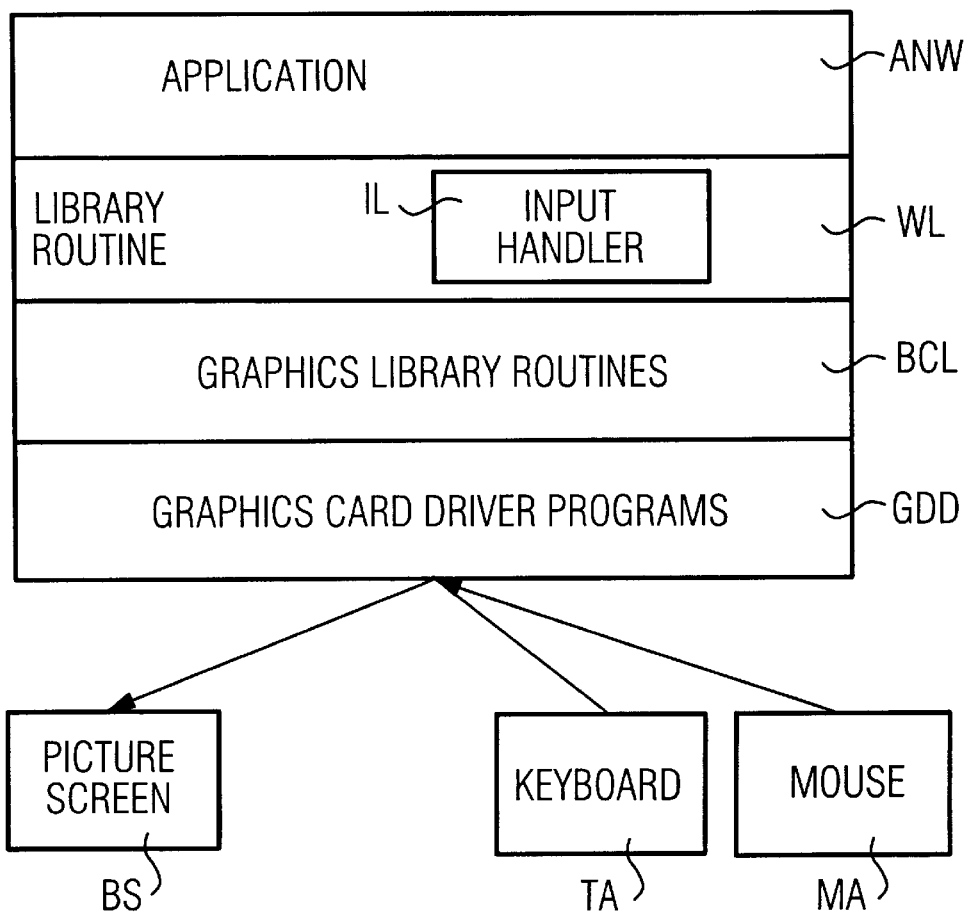

PROCESS FOR ACCESS CONTROL TO COMPUTER-CONTROLLED PROGRAMS USABLE BY SEVERAL USER UNITS AT THE SAME TIME

BACKGROUND OF THE INVENTION

Standard one-user applications (programs) can be introduced into computer-supported conferences by what is referred to as "sharing" of computer-controlled programs. The persons participating in a conference, who can be at different locations, can thereby work in common with the standard one-user application. All participants can view the outputs of the respective application used in common. Exactly one of the participating persons can make inputs to the application at any point in time.

This technical design for application distribution is the basis for information-oriented systems for supporting synchronous collaboration of geographically distributed persons.

There have previously been two different roles for the user in the technical conversion of the "sharing" of applications. It is thus a matter, first, of what is referred to as the "token holder", this indicating that person who has the right at the respective point in time to make inputs for the application, and, second, what is referred to as the "observer", this indicating the other persons participating in the conference who can in fact observe the output of the application but have no right at the respective point in time to make an input for the application.

The role of the "token holder" is time-dependent. It can change between the participants during a conference; however, there is always exactly one "token holder" at every point in time. This means that it is always exactly one person at any point in time who has the right to make inputs for the application. On the basis of this technical solution, each "token holder" works under the privileges and with the access rights of the owner of the application, i.e. with the rights of that user who started the application. The "token holder" can thus implement exactly those operations with the application to which the owner of the application is authorized. The "token holder" can thus no longer be distinguished from the actual owner of the application. The application cannot tell that various persons are working with it, nor can it tell who is working with at a specific point in time. In a certain sense, the respective "token holder" becomes a personification of the application owner due to the existing technical constructs of the "sharing systems".

This procedure harbors great security risks since the "token holder" thereby has access, for example, to the entire datafile system of the owner of the application when the application is, for example, a text processing program with corresponding functionality. In this case, the "token holder" could illegitimately erase, modify, read or copy datafiles without the owner of the application necessarily needing to know about it.

Window systems are currently subdivided into two known categories dependent on the operations and operating mode that these window systems employ.

First, there are what are referred to as client-server window systems with an open network interface (R. Scheifler et al., The X-Window-System, ACM Transactions on Graphics, Vol. 5, No. 2, pp. 79–109, April 1986); second, there are those without an open network interface. The latter are also known as monolithic graphics-based window systems GDWS (Microsoft Windows 3.1 Programmer's Reference, Volume 1: Overview, Microsoft Press, Redmond, ISBN 1-55615-453-4, 1992: R. Orfali et al., Client/Server Programming with OS/2, Van Nostrand Reinhold, New York, ISBN 0-442-01833-9, 1993; Inside Macintosh, Volume VI, Addison Wesley, ISBN 0-201-57755-0,1991).

Further, expansions are also known that make the windows systems in a "sharing"-capable window system: (H. Abdel-Wahab et al., Issues, Problems and Solutions in Sharing X Clients on Multiple Displays, Internetworking: Research and Experience, Vol. 5, pp. 1–15, 1994;
D. Garfinkel et al., HP Shared X: A Tool for Real-Time Collaboration, Hewlett-Packard Journal, pp. 23–26, April 1994;
W. Minenko, Transparentes Application-Sharing unter X Window, Multimediale Telekooperation, Deutsches Forschungszentrum für Künstliche Intelligenz (DFKI) GmbH, Saarbrücken, pp. 1–8, 1994;
J. Baldeschwieler et al., A Survey on X Protocol Multiplexors, ACM SIGCOMM, Computer Communication Review, Swiss Federal Institute of Technology, Computer Engineering and Networks Laboratory (TIK), ETH-Zentrum, Zürich, pp. 16–24, 1993,
U. Pech, Sichtlich beeindruckt, PC Professionell, pp. 71–88, October 1995;
E. Chang et al., Group Coordination in Participant Systems, IEEE, Proceedings of the $24^{th}$ Annual Hawaii International Conference on System Sciences, Vol. 3, No. 4, Kauai, Hi., pp. 589–599, January 1991;
A. Nakajima, A Telepointing Tool for Distributed Meeting Systems, IEEE Global Telecommunications Conference and Exhibition, Vol. 1, No. 3, San Diego, Calif., pp. 76–80, December 1990;
J. Patterson, The Implications of Window Sharing for a Virtual Terminal Protocol, IEEE International Conference on Communications, Vol. 1, No. 4, Atlanta, Ga., pp. 66–70, April 1990;
G. Herter, Intel ProShare, Accounting Technology, Vol. 11, No. 1, pp. 49–54, January 1995;
D. Riexinger et al., Integration of Existing Applications into a Conference System, Proceedings of International Conference on Multimedia Transport and Teleservices, Vienna, pp. 346–355, November 1994).

Further, a security expansion is known for one-user applications usable in common by a plurality of users (G. Gahse, "Zugriffskontrolle in Konferenzsystemen", IBM Deutschland Informationssysteme GmbH, Europäisches Zentrum für Netzwerkforschung, Heidelberg, 1995).

The previously known method for expanding the security of one-user applications in conference systems describes an access control method, whereby a one-user application is to be used in common by a plurality of users sequences under specific "sharing privileges". In this method, a common, new, temporary identity is allocated to the users for the time span of the collaboration. This common temporary identity has access rights ("sharing"privileges) allocated to it, as a result whereof the original rights can be set aside. For example, none of the conference participants can thus illegitimately access data of the local system during use of the application.

A critical disadvantage that can be seen in the known method is that the proposed access control mechanism does not take the various users into consideration in the allocation of requested resources, and, thus, no distinction is possible between the "token holder" and the owner of the application.

A principal cause for security risks that still continue to exist given this method lies therein that a number of persons, for example the system administrator or other users as well that are recited in a specific "authorization datafile", can still set the rights of the other users for an application given this method. As a result of this procedure, users other than the actual owner of the application can still "decide", for example, over the datafile system of the owner of the application. This precondition of the trustworthiness of the users who allocate the rights for applications represents a considerable security risk.

SUMMARY OF THE INVENTION

It is a object of the invention to specify a method for access control to computer-controlled programs that can be simultaneously used by a plurality of user units that avoids the security risks described above.

According to the present invention, a method is provided for access control to computer-controlled programs that can be simultaneously used by a plurality of user units. A request is sent for a program from a user unit. The request for a program is received in a data flow organization unit. A check organization is performed in the data flow organization unit to see whether the user unit from which the request was sent had originally started the program. When the user unit sending the request had started the program, the request is forwarded to the program. When the user unit sending the request had not started the program, implementing an access control for the request on the basis of an access control data bank. The request to the program is forwarded when the access control shows that the request represents an allowed request. The request to the program is not forwarded when the access control shows that the request represents an allowed request.

In this method, a distinction is explicitly made between the owner of the application, i.e. that user who started the application, the respective "token holder" and all other users. The owner of an application (program) produces an access control data bank in which, based on the identities of the other users as well as the type of request that is sent by the users, he can determine as to his own application whether the request of the respective user should be allowed or whether the request should be denied.

In the method, a received request for an application (program and set of library routines) that can be simultaneously used by a plurality of user units is received by a means for the organization of the data flow (what are referred to as multiplexer components) and a check is subsequently carried out to see whether the request was sent from the user unit that had originally started the program.

When this is the case and if the application owner has the input right at the corresponding point in time, the request is forwarded directly to the program.

Otherwise, an access control is implemented for the request on the basis of the access control data bank produced by the owner of the application. What the access control achieves is that only requests explicitly "authorized" by the owner are forwarded to the program.

The security of the "sharing" of applications in conference systems is considerably enhanced by this additional access control.

The method is simplified by the development of the method of the invention in that, before the check whether the user unit had originally started the program, a check is carried out to see whether the user unit that sent the request had a processing right at all, i.e. whether this user unit was a "token holder". When this was not the case at the point in time of the transmission, the request is not even supplied to the further method steps of the invention.

The access control is thus avoided for requests that were sent by users that were not a "token holder" at the point in time the respective request was sent, as a result whereof considerable savings in calculating time are achieved since the access control no longer has to be carried out for all requests received by the means for organizing the data flow (multiplexer unit).

As a result of a further development of the method according to the invention, the security of the method is enhanced further by an authentification of the user unit that has sent the request and/or of the request itself.

The invention is explained in greater detail below on the basis of drawings that shows two exemplary embodiments of the inventive method.

BRIEF DESCRIPTION OF THE DRAWINGS

FIG. 6 is a structogram in which the information that should be at least contained in an access control data bank is shown;

FIG. 8 is a schematic arrangement of resources that employ a monolithic, graphics-based window system of a second exemplary embodiment that is expandable to a monolithic, graphics-based window system in which applications can be simultaneously used by a plurality of users.

DESCRIPTION OF THE PREFERRED EMBODIMENTS

Figure 1:
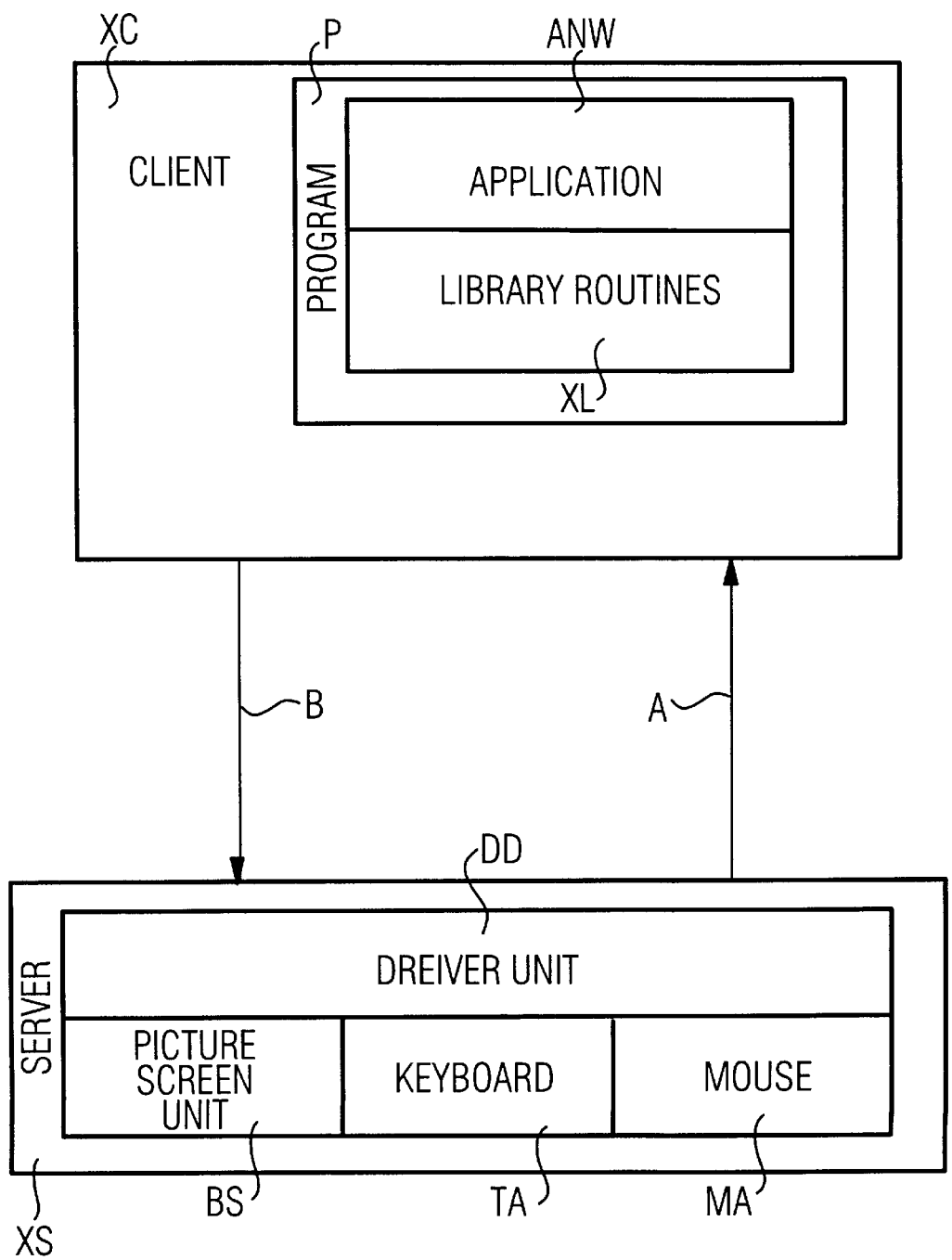
FIG. 1 is a schematic arrangement of resources that employ a window system of a first exemplary embodiment that is expandable to a window system in which applications can be simultaneously used by a plurality of users.

For explanation of a first exemplary embodiment, FIG. 1 shows an arrangement in which individual components (resources) are described that use a known windows system described in R. Scheifler et al., The X Window System, ATM Transactions on Graphics, Vol. 5, No. 2, pp. 79–109, April 1986.

This arrangement comprises at least the following components:

a user unit, referred to below as a server XS, which in turn comprises the following components:

At least one driver unit DD that enables a coupling between further periphery components with a client XC described later, a picture screen unit BS, a keyboard TA, a mouse MA, the client XC, which comprises at least the following components:

a set of library routines XL, and an application ANW.

The picture screen unit BS, the keyboard TA, the mouse MA as well as, potentially existing other periphery units form the above-described periphery components that are coupled to the client XC via the corresponding driver units DD.

The set of library routines XL of the client XC forms the interface between the known, above-described window system and the application ANW.

Together, the library routines XL as well as the application ANW form a program P.

Even though only respectively one application ANW or, respectively, one program P is described in this exemplary embodiment, a plurality of applications ANW and, thus, a plurality of clients XC can, of course, be made available on a computer unit executing these applications ANW.

This arrangement shown in FIG. 1 is thus only a very simple, basic example of the execution of the communication of a client XC with the server XS as implemented under the known window system.

A request A is sent from the server XS to the client XC, as a result whereof actions, for example in the application ANW, are initiated in the client XC. This request can, for example, represent an input on the keyboard that is "translated" into the request A by the driver units DD and sent to the client XC.

The application ANW, for example a text processing program or a calculation program as well, a drafting program and similar programs, can now accept the input and, for example, incorporate it into the text datafile as a new letter.

So that the modification in the text datafile can also be displayed on the picture screen BS, a display request (by way of example in this case) is sent in an answer B to the picture screen unit BS to implement a modification in the picture screen display.

Figure 2:
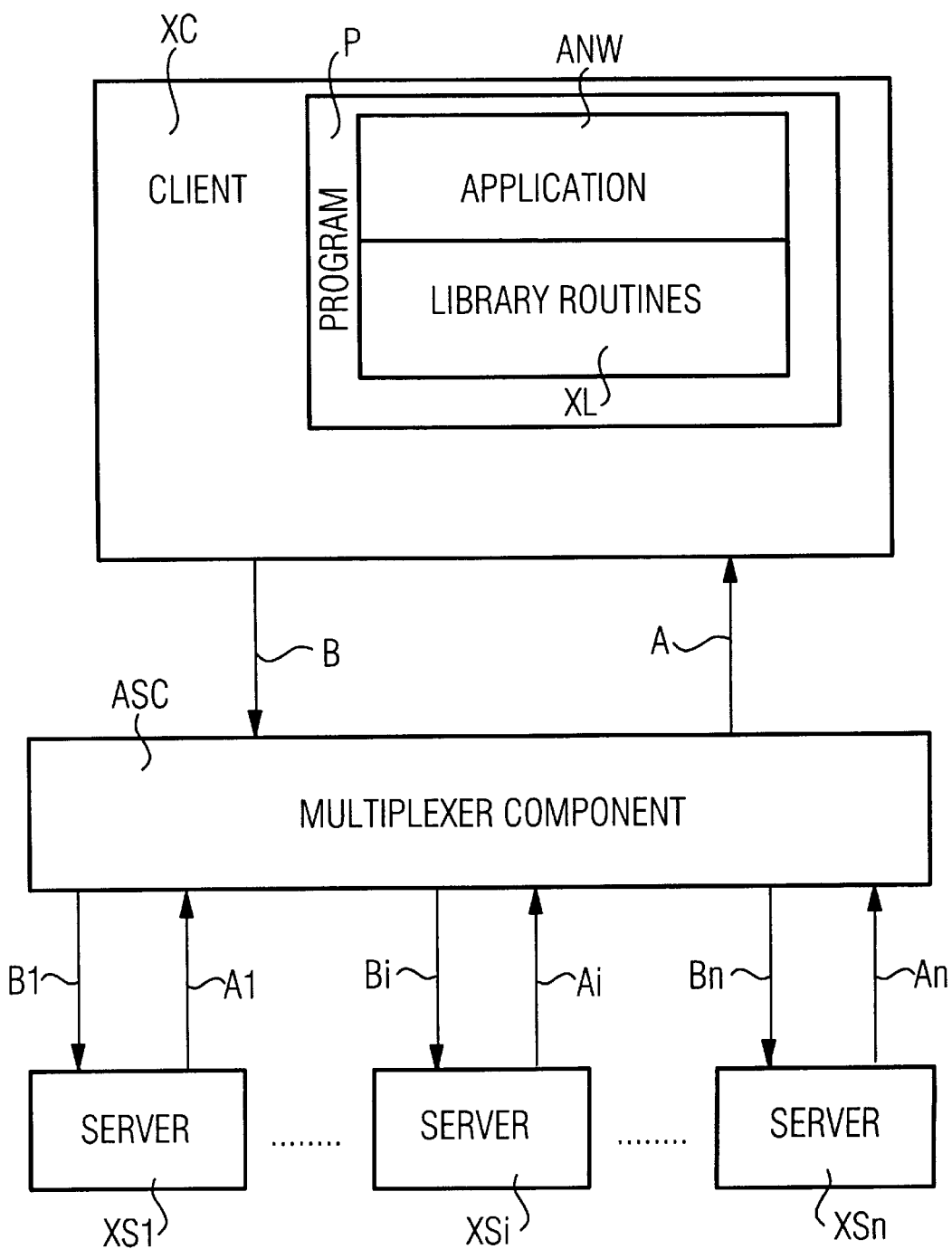
FIG. 2 is a schematic arrangement of an expansion of the resources described in FIG. 1, as a result of which the simultaneous use of an application by a plurality of users is possible.

FIG. 2 shows an arrangement that, compared to the arrangement described in FIG. 1, is expanded by a means for the organization of the data flow, which is referred to below as a multiplexer component ASC, so that a conference system is enabled on the basis of the window system described above.

A number of different realizations of the multiplexer component ASC are known. These are described, for example, in (D. Garfinkel et al., HP Shared X: A Tool for Real-Time Collaboration, Hewlett-Packard Journal, pp. 23–26, April 1994; W. Minenko, Transparentes Application-Sharing unter X Window, Multimediale Telekooperation, Deutsches Forschungszentrum für Künstliche Intelligenz (DFKI) GmbH, Saarbrücken, pp. 1–8,1994.

An investigation of different realizations of the multiplexer component ASC is described in (J. Baldeschwieler et al., A Survey on X Protocol Multiplexors, ACM SIGCOMM, Computer Communication Review, Swiss Federal Institute of Technology, Computer Engineering and Networks Laboratory (TIK), ETH-Zentrum, Zürich, pp. 16–24, 1993.

The multiplexer component ASC now makes it possible that a plurality of servers XSi communicate via the multiplexer component ASC with the client XC and can thus respectively access the program P. An index i thereby respectively unambiguously identifies every server XSi and is an arbitrary natural number between 1 and n, whereby the number n indicates the plurality of servers XSi that are coupled to the client via the multiplexer component ASC.

The multiplexer component ASC should comprise at least the following properties:

The multiplexer component ASC is connected between the client XC and the servers XSi.

Relative to the client XC, the multiplexer component assumes the functionality of a single server XS in order to thus preserve the functionality of the arrangement according to FIG. 1.

Relative to the n servers XSi, the multiplexer component ASC assumes the functionality of the client XC, as a result of which n "logical clients" are modelled by the multiplexer component ASC.

A conference inquiry Ai is thus respectively sent to the multiplexer component ASC from a server XSi. In the multiplexer component ASC, the respective conference inquiry Ai is converted into the inquiry A that is sent to the client XC.

By contrast to the arrangement that was described in FIG. 1, the display request B of the client XC is sent to the multiplexer component ASC, where it is then converted into a conference display request Bi and is sent to the respective server XSi that sent the conference inquiry Ai.

Dependent on the type of conference display request Bi, however, it can also necessary that the display request B is distributed to every server XSi. This is necessary, for example, when the display request B is formed of in a request to the picture screen unit BS (see FIG. 1) since, of course, a modification of the picture screen content must be visible on every server XSi.

The multiplexer component ASC thus assumes the functionality of a multiplexer and demultiplexer, i.e. the organization of the data flow.

The display request B of the client XC to the coupled servers XSi is thus multiplexed in the multiplexer component ASC, whereby copies of the display request B are sent to the individual servers XSi.

Changes in the individual conference display requests Bi are thereby implemented according to the different resources of the servers XSi, for example given different color displays at the servers XSi, when different types of picture screen units (see FIG. 1) BS are employed at the server XSi or the like.

Conference requests Ai sent by the servers XSi are collected in the multiplexer component ASC and potentially unallowed conference requests Ai are filtered out. The allowed conference requests Ai are forwarded to the client XC as though these conference requests Ai came directly from a single server XS (see FIG. 1) and not, as is in fact the case, from a plurality of servers XSi.

Figure 3:
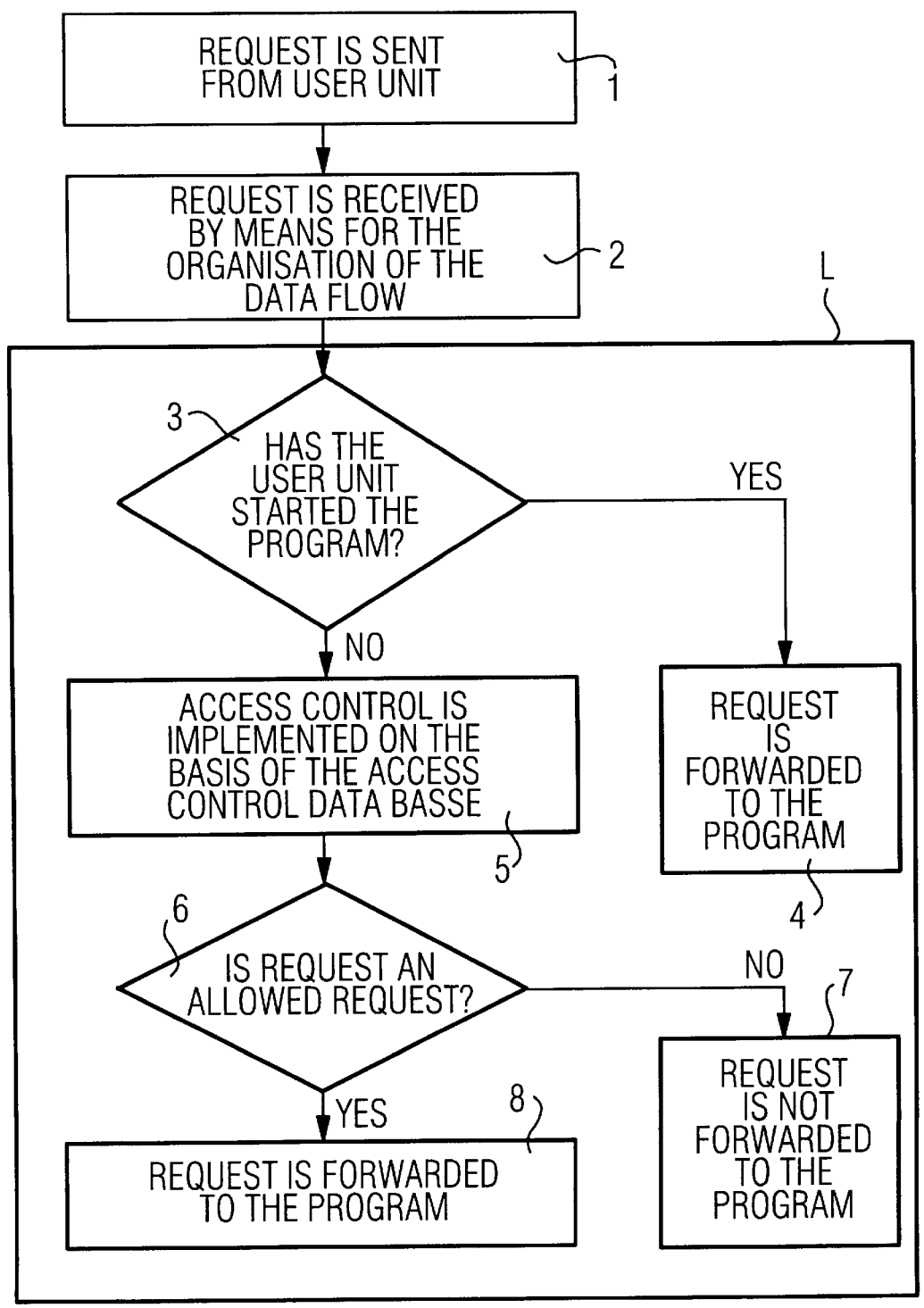
FIG. 3 is a flowchart in which individual method steps of the inventive method of the invention are shown.

FIG. 3 shows individual method steps of the inventive method.

All component references are from FIG. 2.

In a first step 1, a conference request Ai is sent from an arbitrary server XSi to the multiplexer component ASC.

The conference request Ai is received 2 by the multiplexer component ASC.

After reception of the conference request Ai, a check is made in a further step 3 to see whether the server XSi that sent the conference request Ai originally started the program P to which the conference request Ai relates.

This corresponds to the check whether the sender of the conference request Ai is the owner of the application ANW.

When the server XSi sending the conference request Ai originally started the program P and when it has the input right at the corresponding point in time, the multiplexer component ASC forwards (step 4) the conference request Ai directly to the client XC and, thus, to the program P and the application ANW.

This occurs because the owner of the application ANW has complete control of his application ANW in the framework of this invention. For this case, thus, it is also not necessary to implement a further access control for conference requests Ai that were sent by the owner of the application ANW.

Figure 7:
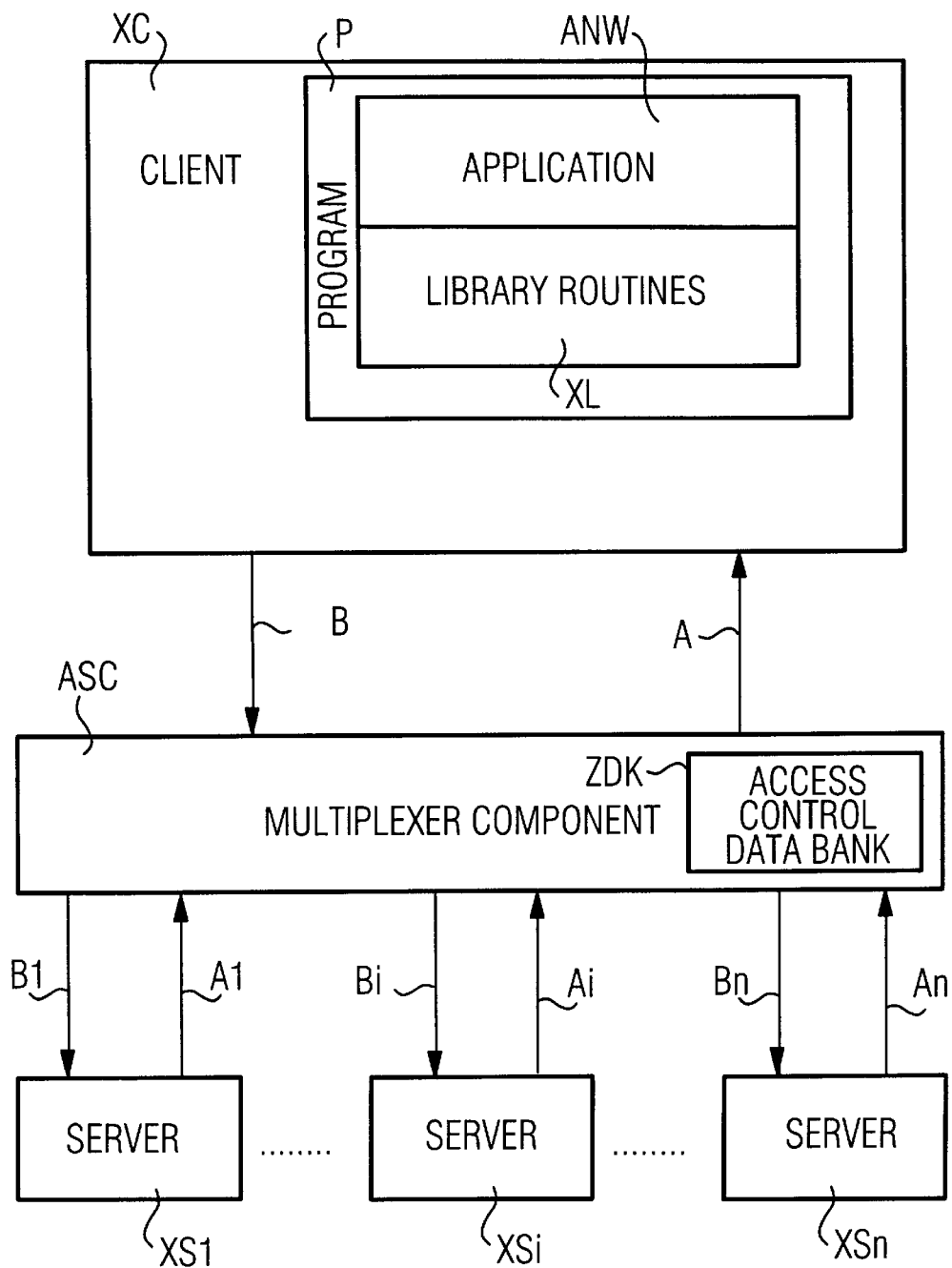
FIG. 7 is an arrangement in which the necessary security expansion of the arrangement described in FIG. 2 is represented by an access control data bank.

When, however, the conference request Ai is sent by a server XSi that is not the owner of the application ANW, an additional access control is implemented (step 5) for the conference request Ai on the basis of an access control data bank ZDK(see FIG. 6 and 7). The access control distinguishes the conference request Ai into allowed conference requests Ai and unallowed conference requests Ai.

In a further step 6, the result of the access control (step 5) implemented above is reviewed. When the application owner classified the conference request Ai as an unallowed conference request Ai, the conference request Ai is not forwarded to the client XC and, thus, is also not forwarded to the application ANW but is discarded (step 7).

When, however, the conference request Ai was classified by the application owner as an allowed conference request Ai, this conference request Ai is forwarded (step 8) to the client XC and, thus, to the application ANW.

As a result of this procedure, a distinction is made not only, as previously, between the person who has a processing right at the point in time of transmission of the conference request Ai, i.e. is what is referred to as the "token holder", and the further users, what are referred to as "observers".

A further distinction is added by the inventive method, namely the distinction whether or not the server XSi that sent the conference request Ai is also the owner of the application ANW, i.e. whether or not the application ANW had been originally started by the corresponding server XSi.

Given a suitable classification of allowed conference requests Ai by the application owner in the access control data bank ZDK (see FIG. 6 and 7), this additional distinction prevents unauthorized third parties from accessing resources of the owner of the application ANW.

As a result of the inventive method, only the owner of the application ANW is now authorized to completely access his own resources.

Moreover, the owner of the application ANW has the sole right to construct the access control data bank ZDK (see FIG. 6 and 7) and, thus, is the only one having the possibility of quite specifically granting or denying specific rights for the conference participants with whom he uses the application ANW he started in common, i.e. all other servers XSi.

The security risk that the method described in G. Gahse, "Zugriffskontrolle in Konferenzsystemen", IBM Deutschland Informationssysteme GmbH, Europäisches Zentrum für Netzwerkforschung, Heidelberg, 1995 comprises and that was described above is thus also avoided, since no user units other than the owner of the application ANW himself can grant access rights to the application ANW and also have no "omnipotent" access rights to the application without the consent of the owner of the application ANW.

The access control data bank is thus exclusively set up and controlled by the owner of the application ANW, i.e. proceeding from that server XSi from which the application ANW has been originally started.

The access control data bank ZDK should comprise at least the following information in order to be able to efficiently implement the access control for each conference request Ai (see FIG. 6):

A specification of the client XC (see FIG. 2) to whom the entry in the access control data bank ZDK refers, for example by specification of an Internet protocol address (IP) and, additionally, of the corresponding address of the port;

a specification AXSi of the server XSi (see FIG. 2) to which the entry in the access control data bank ZDK refers, for example by specifying the picture screen address of the respective server XSi (see FIG. 2);

a specification of the respective type AAT of the conference request Ai to which the entry in the access control data bank ZDK refers, for example XCreate, XRequest, etc., for the first exemplary embodiment given the above-described window system;

further parameters WP the further parameters WP can, for example, comprise an allowed value range for the respective conference request type.

The way in which the access control data bank is allowed to be constructed and modified can be variously realized.

For example, it is provided that the owner of the application ANW (see FIG. 2) constructs the access control data bank as text datafile with the assistance of a text editor.

Further, it is also provided to employ a picture screen mask for constructing the access control data bank ZDK, this intuitively enabling and, thus, facilitating the input for producing the access control data bank ZDK for the owner of the application ANW.

It is also provided to define templates for predetermined conference participants. The templates are access control data banks that were predefined for specific security scenarios, for example for specific applications and for specific conference participants, and, easily callable for the respectively started application ANW (see FIG. 2), can be incorporated as access control data bank ZDK by the owner of the application.

Additional measures for the authentification of the messages that serve for the definition, i.e. the production of the access control data bank ZDK or, further, for the modification of the data in the access control data bank ZDK are provided in a development of the method in order to prevent unauthorized third parties obtaining access to the access control data bank ZDK itself.

Cryptographic methods for authentification are familiar to a person skilled in the art, for example asymmetrical cryptographic methods with which a digital signature and, thus, an authentification of the sender of the respective message is possible or, further, the employment of a one-way function with which a hash value is formed at least over a part of the conference request Ai. (see FIG. 2).

Figure 4:
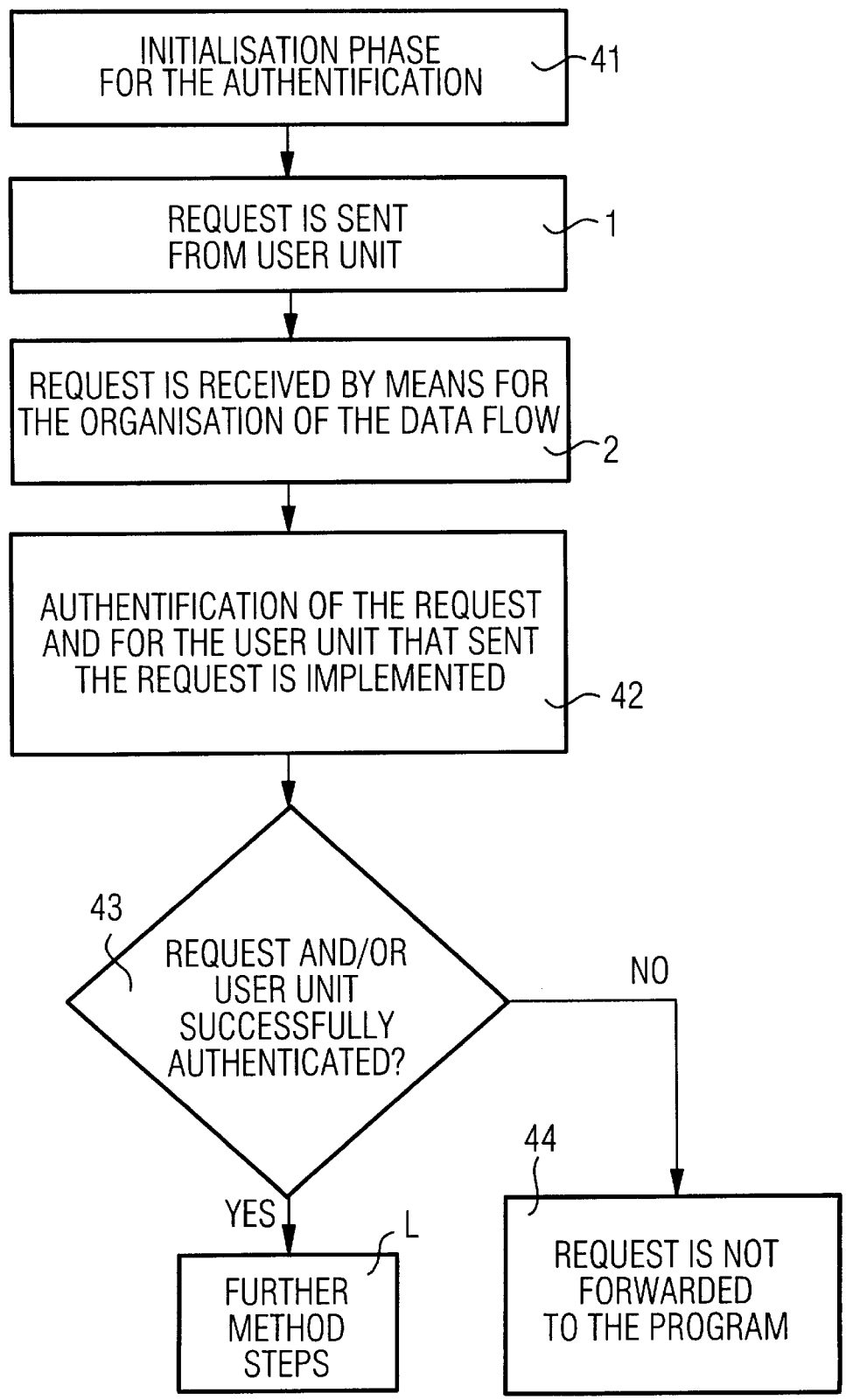
FIG. 4 is a flowchart in which a development by means of an authentification of the request and/or of the sender of the request is implemented.

In a development of the method, which is shown in FIG. 4 (but where all component references are to FIG. 2), an initialization of the authentification described below is implemented (step 41) before the beginning of the method. This occurs, for example, with the following procedure.

Given the assumption that the multiplexer component ASC has an application certificate and the user units, i.e. the servers XSi, respectively have a user certificate that are respectively unambiguously allocated to the user units, the multiplexer component ASC then generates a first random number.

After a transport connection has been set up between the multiplexer component ASC and the respective server XSi, the multiplexer component ASC sends a first negotiation message to the user unit, this comprising at least the following components:

the program certificate, the first random number, a first proposal for a cryptographic method to be subsequently employed, and a digital signature that is formed at least over the first random number as well as the first proposal.

The first negotiation message is received by the respective user unit, i.e. the server XSi.

The user unit XSi checks the program certificate for correctness.

Further, the digital signature is checked.

When the check of the program certificate and of the digital signature supplies a positive result, a further check is carried out in the user unit XSi to see whether the proposed cryptographic algorithms that were proposed in the first negotiation message can be subsequently employed for the authentification and safeguarding of the transmission.

When the user unit XSi cannot support the proposed cryptographic algorithms, the user unit, i.e. the server XSi, forms a second proposal in a second proposal message and sends it to the multiplexer component ASC. The second proposal comprises cryptographic methods that the user unit XSi supports. These are now proposed to the multiplexer component ASC as cryptographic methods to be employed in the further method for this logical connection between the multiplexer component and the user unit XSi.

The second proposal message comprises at least the following components:
   the user certificate of the respective server XSi,
   a second random number that was generated by the user unit XSi itself,
   the second proposal,
   a digital signature that is respectively formed at least over the first random number, the second random number as well as the second proposal.

The second proposal message is sent to the multiplexer component ASC.

When the cryptographic algorithms indicated in the first proposal are supported by the user unit XSi, the user unit XSi forms an acknowledgment message and sends it to the multiplexer component ASC.

The acknowledgment message comprises at least the following components:
   the user certificate
   the second random number,
   a positive acknowledgment, and
   a digital signature that is respectively formed at least over the first random number, the second random number and the positive acknowledgment.

The acknowledgment message is sent to the multiplexer component ASC.

The negotiation message or the acknowledgment message is received by the multiplexer component ASC and a check is performed in the multiplexer component ASC to see whether the user certificate as well as the digital signature are correct.

When the check supplies a positive result and the received message was the acknowledgment message, further, the multiplexer component ASC generates a first session key taking the declared cryptographic algorithms into consideration for a following useful data transmission phase.

A first session key message that comprises at least the following components is formed from the first session key and sent to the user unit XSi:
   the first session key encoded with the public key of the server XSi,
   a specification of the cryptographic methods to be employed,
   a digital signature formed at least over the first random number, the second random number, the first session key, as well as the specification of the cryptographic methods to be employed.

When the second negotiation message was received by the multiplexer component ASC and the check of the user certificate and of the digital signature or of the hash value of the second negotiation message has supplied a positive result, a check is carried out in the multiplexer component ASC to see whether the cryptographic algorithms proposed in the second negotiation message for the implementation of the further cryptographic methods are supported by the multiplexer component ASC.

When the proposed cryptographic methods are supported by the multiplexer component ASC, a first session key is generated taking the declared cryptographic algorithms for the following useful data transmission phase into consideration.

As was described above, further, a first session key message is sent to the multiplexer component ASC upon employment of the first session key.

This above-described procedure for the "negotiation" of the cryptographic methods to be employed is repeated until both the user unit XSi as well as the multiplexer component ASC accept the most recently proposed cryptographic method.

The first session key is determined in the user unit XSi upon employment of a private key of the user unit XSi. Further, the digital signature of the first session key message is checked.

When the check of the digital signature supplied a positive result, a second session key message is also formed upon employment of a second session key that is formed by the user unit XSi.

The second session key message comprises at least the following components:
   the second session key encrypted with a public program key of the multiplexer component ASC,
   a digital signature formed at least over the first random number, the second random number, the second session key or a hash value formed over the same components.

The multiplexer component ASC receives the second session key message and determines the second session key. The digital signature or the hash value of the second session key message is checked.

When the check of the digital signature supplied a positive result, the session keys that have been exchanged are employed in the following useful data transmission phase for the encryption of the useful data. Each participating entity thereby employs the session key that it itself generated for the transmission of useful data, whereas the received session key is employed exclusively for the reception of useful data.

Further cryptographic methods for the key exchange or, respectively, for the formation of the session key for the useful data encryption can be utilized without limitation in the framework of the inventive method.

After the initialization phase for the authentification (step 41) has been concluded, an authentification of the conference request Ai and/or of the user unit XSi sending the conference request Ai is implemented (step 42) in the multiplexer component ASC in the useful data transmission phase respectively after reception of the respective conference request Ai.

In a further step 43, a check is carried out to see whether the authentification supplied a positive result. When this is the case, the conference request Ai is supplied (further steps L) to the further method describe above.

When, however, the authentification (steps 43) yielded a negative result, the conference request Ai is discarded and, thus, is not forwarded (steps 44) to the client XC.

Figure 5:
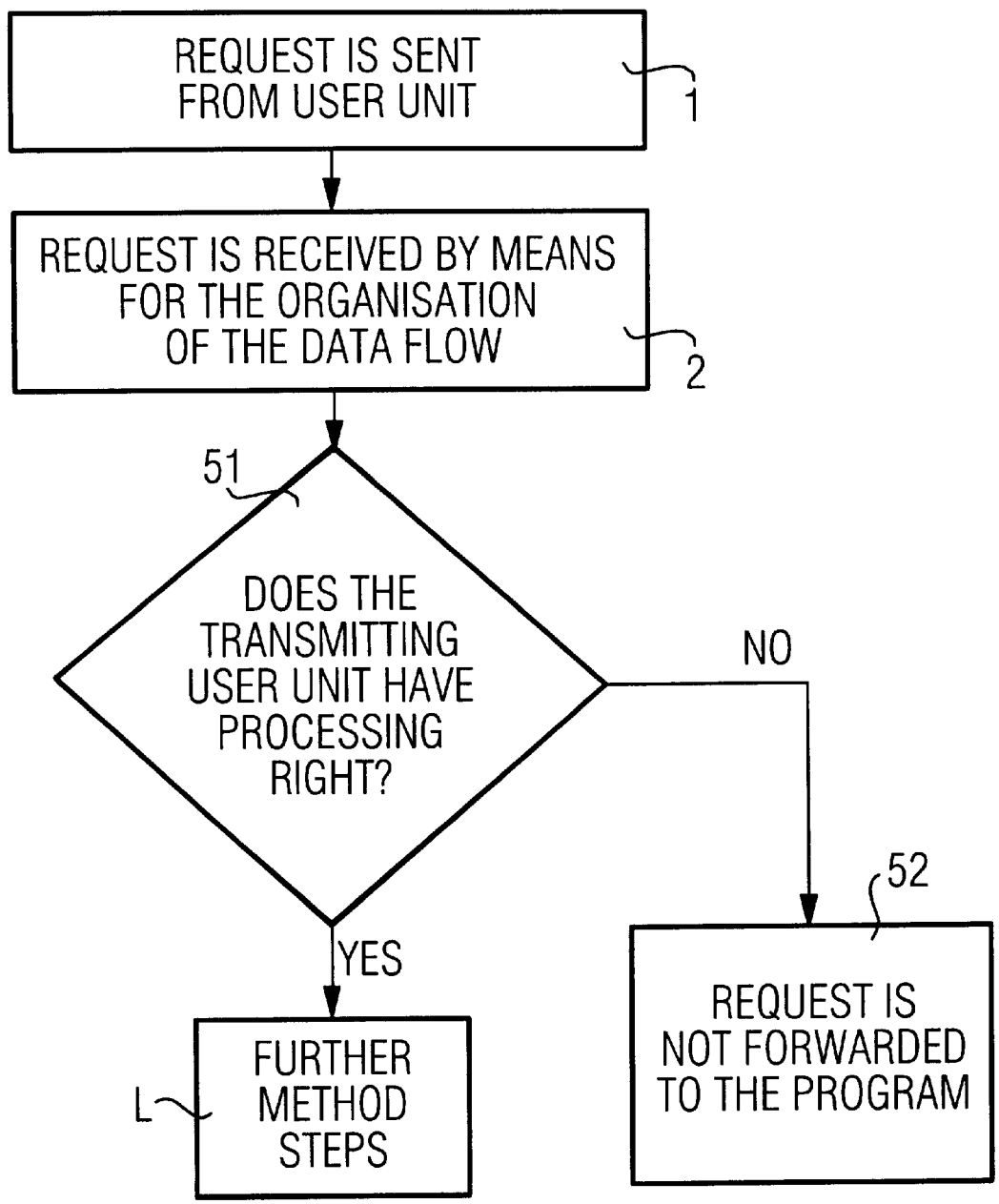
FIG. 5 is a flowchart in which a development of the method is described, whereby a check is carried out at the beginning of the method as to whether the user unit sending the request has a processing right for the application at the time of the transmission.

A development of the method is also comprised in checking (step 2) with the multiplexer component ASC after reception of the conference request Ai to see whether the user unit XSi that sent the conference request Ai had (steps 51) a processing right at the respective point in time of the transmission (see FIG. 5).

This corresponds to the question as to whether the user unit XSi was "token holder" of the application ANW at the point in time of the transmission of the conference request Ai.

When this is the case, the conference request Ai is subjected (further steps L) to the further method steps of the inventive method. When, however, this is not the case, the conference request Ai is not forwarded and is thus discarded (steps 52).

This development exhibits the advantage that a conference request Ai that is not allowed anyway since it was sent from a user unit XSi that did not possess the processing right at all at the time is subjected to the entire method. Superfluous access controls are thus avoided.

The necessary expansion of the arrangement described in FIG. 2 so that the arrangement can implement that method described above is shown in FIG. 7. This expansion is comprised therein that an additional access control data bank ZDK is provided in the multiplexer component ASC.

Further, of course, the provided checks that were described above must be implemented.

In a second exemplary embodiment, the method is described for computer units that employ monolithic, graphics-based window systems that comprise no open communication interface between the application ANW and the window system (see FIG. 8).

Examples of such monolithic graphics-based window systems are known and were cited above.

Given monolithic graphics-based window systems, the window protocol must likewise be "broken up" between the application ANW and the user interface for the distribution of a one-user application. The procedure is thereby fundamentally analogous to that already described.

The possible points for the intervention into the window protocol are described below.

The structure of this monolithic graphics-based window system GDWS is shown in FIG. 8.

Monolithic graphics based windows systems GDWS comprise at least the following components:
the picture screen BS,
the keyboard TA,
the mouse MA,
graphics card driver programs GDD,
graphics library routines BCL,
window library routines WL with an input handler IL,
the application ANW.

In this exemplary embodiment, the application ANW runs in the same environment as the graphics-based window system GDWS, and both employ a set of function calls in a common memory in order to communicate with one another.

Since graphics-based window systems GDWS comprise no open communication interface, the structure shown in FIG. 8 must be intervened in for applications ANW that are to be simultaneously used by a plurality of users.

The expansions can be undertaken at various locations of the respective graphics-based window system GDWS, for example at a first programming interface between the window library routines WL and the application ANW, at a second programming interface between the graphics library routines BCL and the window library routines WL or at the graphics card driver programs GDD.

These modifications are only possible if the window library routines WL, the graphics library routines BCL or the graphics card driver programs GDD are not permanently bound to the application ANW but dynamically. These types of programs are referred to as dynamic link library (DLL).

The necessary modifications are known.

The inventive method itself is also implemented as described above given these monolithic, graphics-based window systems GDWS.

Although various minor changes and modifications might be proposed by those skilled in the art, it will be understood that my wish is to include within the claims of the patent warranted hereon all such changes and modifications as reasonably come within my contribution to the art.

What is claimed is:

1. A method for access control to computer-controlled programs that can be simultaneously used by a plurality of user units, comprising the steps of:
sending a request for a program from a user unit;
receiving the request for the program in a data flow organization unit;
performing a check organization in the data flow organization unit to see whether the user unit from which the request was sent had originally started the program;
when the user unit sending the request had started the program, forwarding the request to the program;
when the user unit sending the request had not started the program, implementing an access control for the request on the basis of an access control data bank;
forwarding the request to the program when the access control shows that the request represents an allowed request; and
not forwarding the request to the program when the access control shows that the request represents an unallowed request.

2. The method according to claim 1, wherein before the check whether the user unit had originally started the program, performing a check in the organization unit to see whether the user unit possesses a processing right at the time of transmission of the request; and
not forwarding the request to the program when the user unit had no processing right.

3. The method according to claim 1, wherein an authentification of the user unit that sent the request or of the request is implemented at a beginning of the method.

4. The method according to claim 3, wherein an initialization phase for the authentification is implemented given a connection setup between a user unit and the program.

5. Method according to claim 1 whereby the access control data bank comprises at least the following information:
a specification of the client to which the entry in the access control data bank refers;
a specification of the window to which the entry in the access control data bank refers;
the user unit;
a specification of a request type whose more detailed properties are specified in further parameters; and
further parameters that the request must comprise in order to be accepted as an allowed request.

6. A method for access control to computer-controlled programs that can be simultaneously used by a plurality of user units, comprising the steps of:
sending a request for a program from a user unit;
receiving the request for the program in a data flow organization unit and authenticating the user unit that sent the request;

implementing an initialization phase for the authentification given a connection setup between the user unit and the program;

providing the organization unit as a multiplexer component;

in the initialization phase, where the user unit has a user certificate and the multiplexer component has a program certificate, performing the following steps:
generating a first random number by the multiplexer component;
with the multiplexer component, sending a first negotiation message to the user unit, said negotiation message comprising at least the following components
a program certificate,
a first random number,
a first proposal, and
a digital signature that is formed at least over the first random number
and the first proposal;

receiving the first negotiation message by the user unit;

checking the program certificate by the user unit;

checking the digital signature by the user unit;

when the check of the program certificate and of the digital signature supplies a positive result, with the user unit checking whether proposed cryptographic algorithms can be subsequently employed;

when the cryptographic algorithms are not supported by the user unit with the user unit forming a second proposal in a second proposal message and sending the second proposal to the multiplexer component, said second proposal message comprising at least the following components:
the user certificate,
a second random number that is generated by the user unit,
a digital signature that is formed at least over the first random number,
the second random number and the further proposal;

when the cryptographic algorithms are supported, forming with the user unit an acknowledgment message and sending it to the multiplexer component, said acknowledgment message comprising at least the following components
a user certificate,
a second random number that is generated by the user unit,
a positive acknowledgment, and
a digital signature that is formed at least over the first random number, the second random number and the positive acknowledgment;

receiving the second negotiation message or the acknowledgment message by the multiplexer component;

checking with the multiplexer component the user certificate;

checking with the multiplexer component the digital signature;

when the check of the user certificate and of the digital signature supplies a positive result and the acknowledgment message was received, generating with the multiplexer component a first session key taking the declared cryptographic algorithms for a following useful data transmission phase into consideration;

when the check of the user certificate and of the digital signature supplies a positive result and the further negotiation message was received, checking with the multiplexer component whether the proposed cryptographic algorithms can be subsequently employed;

when the proposed cryptographic algorithms can be subsequently employed, generating with the multiplexer component a first session key taking the declared cryptographic algorithms for a following useful data transmission phase into consideration;

sending with the multiplexer component a first session key message to the user unit, said first session key message comprising at least the following components:
the first session key encrypted with a public key of the user unit, and
a digital signature formed at least over the first random number, the second random number, and the first session key;

determining with the user unit the first session key upon employment of a private user key;

checking with the user unit the digital signature;

sending with the user unit a second session key message to the program, said second session key message comprising at least the following components:
the second session key encrypted with a public key of the multiplexer component,
a digital signature or hash value formed at least over the first random number, the second random number, and the second session key;

receiving the second session key message with the multiplexer component; checking the digital signature or the hash value with the multiplexer component; and beginning the useful data transmission phase when the check supplies a positive result, whereby each entity employs the session key that it itself generated for the sending of data, and whereby the respectively received session key of the collaborating entity is employed exclusively for the reception of transmitted messages;

performing a check organization in the data flow organization unit to see whether the user unit from which the request was sent had originally started the program;

when the user unit sending the request had started the program, forwarding the request to the program;

when the user unit sending the request had not started the program, implementing an access control for the request on the basis of an access control data bank;

forwarding the request to the program when the access control shows that the request represents an allowed request; and not forwarding the request to the program when the access control shows that the request represents an unallowed request.

* * * * *